Feb. 10, 1925.
1,525,824
R. PALMER
METHOD OF AND APPARATUS FOR HEATING FUEL MIXTURES
Filed Aug. 4, 1922
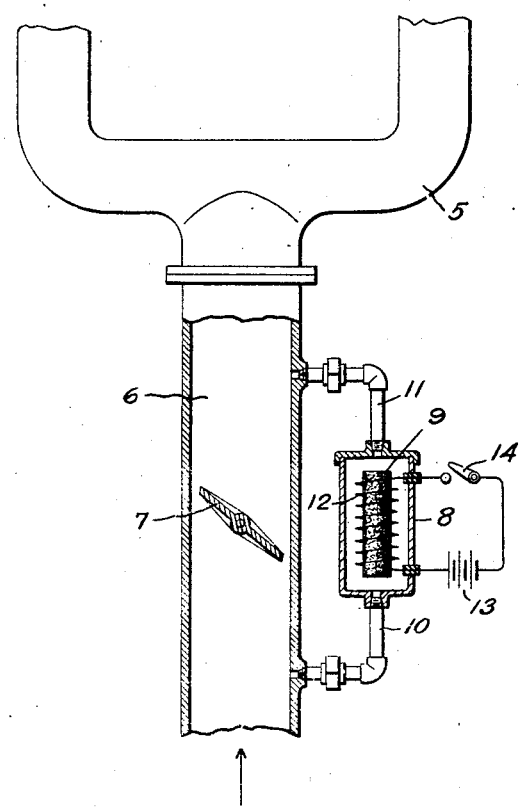
Inventor:
Robert Palmer;
by
His Attorney Patented Feb. 10, 1925.

1,525,824

UNITED STATES PATENT OFFICE.

ROBERT PALMER, OF SCHENECTADY, NEW YORK, ASSIGNOR TO GENERAL ELECTRIC COMPANY, A CORPORATION OF NEW YORK.

METHOD OF AND APPARATUS FOR HEATING FUEL MIXTURES.

Application filed August 4, 1922. Serial No. 579,685.

*To all whom it may concern:*

Be it known that I, ROBERT PALMER, a citizen of the United States, residing at Schenectady, county of Schenectady, State of New York, have invented certain new and useful Improvements in Methods of and Apparatus for Heating Fuel Mixtures, of which the following is a specification.

The present invention relates to heating means for fuel mixtures and more particularly heating means for a hydrocarbon fuel mixture used to operate internal combustion engines. A particular application of my invention is that of heating the hydrocarbon fuel mixture for the internal combustion engine of an automobile.

The object of my invention is to provide an improved method of and apparatus for heating fuel mixtures and for a consideration of what I believe to be novel and my invention, attention is directed to the accompanying description and the claims appended thereto.

In the drawing, the figure is a diagrammatic view, partly in section, of a structure embodying my invention.

Referring to the drawing, 5 indicates the manifold of an internal combustion engine which distributes fuel mixture to the cylinders of an internal combustion engine, and 6 indicates the mixing tube which conveys the fuel and air mixture from the carburetor to the manifold. In mixing tube 6 is a throttle valve 7. The manifold, mixing tube, and throttle valve are shown only diagrammatically and are to be taken as typical of any suitable structures.

According to my invention I heat the fuel and air mixture on its way to the engine cylinder or cylinders by utilizing a catalytic agent which effects a partial decomposition or burning of the fuel mixture thereby imparting heat to the mixture.

According to a preferred embodiment of my invention, I provide an auxiliary combustion chamber in proximity to the mixing tube and in such chamber I place a catalytic agent, such as platinum black, which is capable of effecting a partial decomposition or burning of hydrocarbons with generation of heat. I then conduct some of the hydrocarbon and air mixture from the mixing tube through the auxiliary combustion chamber and thence back to the mixing tube. In passing through the auxiliary combustion chamber the mixture flows over the catalytic agent which serves to effect a partial decomposition or burning of the mixture thus generating heat and raising its temperature. The mixture thus heated in the auxiliary chamber upon flowing back to the mixing tube mingles with the other portion of the mixture and imparts heat to it. By this means the entire mixture coming from the carburetor is heated before it reaches the engine cylinders. To start the action of the catalytic agent I preferably provide a heating means for it. For example, in the case of an automobile I may provide an electric resistance heating unit connected to a suitable source of electrical energy such as the storage battery of the automobile for effecting the initial heating of the catalytic agent. It will be understood of course, that after the action is started, the decomposition or burning will serve to keep the catalytic agent heated.

In the drawing, 8 indicates an auxiliary combustion chamber and 9 a catalytic agent suitably mounted therein. The combustion chamber is connected at one end to mixing tube 6 by a conduit 10 and at the other end to mixing tube 6 by a conduit 11. Conduit 10 connects to the mixing tube in advance of conduit 11 as regards the direction of flow through the tube, the direction of flow being indicated by the arrow. Preferably such connections are made one on each side of throttle valve 7 so as to take advantage of the drop in pressure across the valve to create a flow through the chamber 8. With the arrangement shown a certain amount of the mixture flowing from the carburetor will be diverted through conduit 10 to chamber 8 and from chamber 8 through conduit 11 back to the mixing tube. In flowing through chamber 8, the hydrocarbon in the mixture will react with the catalytic agent as explained above, whereby the mixture is heated prior to being returned to the mixing tube.

In connection with the catalytic agent I have shown a heating coil 12 connected to a source of electrical energy 13, the connections including a switch 14. By closing switch 14 the catalytic agent can be initially heated.

In accordance with the provisions of the patent statutes, I have described my method and the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The method of heating a fuel mixture as it flows through a mixing tube to the intake manifold of an internal combustion engine, which method comprises subjecting the flowing mixture to the action of a catalytic agent.

2. The method of heating a fuel mixture as it flows through a mixing tube to the intake manifold of an internal combustion engine, which method comprises continuously withdrawing a portion of the mixture from the main stream, subjecting it to the action of a catalytic agent to heat it, and then returning it again to the main stream.

3. The combination with the mixing tube of an internal combustion engine, of an auxiliary chamber, means connecting it to the mixing tube a catalytic agent therein, and means for circulating a portion of the fuel mixture flowing through the mixing tube through said auxiliary chamber whereby it is subjected to the action of said catalytic agent and heated.

4. In combination, a fuel mixing tube, a valve therein, a chamber, a catalytic agent in the chamber for heating fuel flowing from it, and conduits connecting the chamber to the mixing tube on opposite sides of said valve.

In witness whereof, I have hereunto set my hand this 2nd day of August, 1922.

ROBERT PALMER.